United States Patent
Kerr et al.

[11] Patent Number: 6,149,107
[45] Date of Patent: Nov. 21, 2000

[54] PIPE FITTING SUPPORT BRACKET

[75] Inventors: Steven H. Kerr, Canyon Country; Harry H. Bekeredjian, Canoga Park, both of Calif.

[73] Assignee: Spears Manufacturing Co., Sylmar, Calif.

[21] Appl. No.: 09/158,174

[22] Filed: Sep. 21, 1998

[51] Int. Cl.[7] .................................................. F16L 3/00
[52] U.S. Cl. .............................................. 248/49; 248/65
[58] Field of Search ...................... 248/49, 65, 73, 248/74.1; 403/205, 231

[56] References Cited

U.S. PATENT DOCUMENTS

| D. 30,441 | 3/1899 | Wahlert | 139/150 |
|---|---|---|---|
| 1,042,881 | 10/1912 | Bowen | 248/74.1 |
| 1,261,213 | 4/1918 | Clay | 403/205 X |
| 4,379,537 | 4/1983 | Perrault et al. | 248/74.1 |
| 5,529,268 | 6/1996 | Wright | 248/74.1 X |

OTHER PUBLICATIONS

Vanguard Polybutylene Piping and Fittings for the Contractor (product catalogue) (excerpted) (date of publication unknown).

Plastic Plumbing Products NIBCO Catalogue 2–100–D (excerpted) (publication unknown).

CPVC Price List, Thompson Plastics, Inc. (excerpted) (Feb. 1995).

*Primary Examiner*—Ramon O. Ramirez
*Attorney, Agent, or Firm*—Sheldon & Mak; Denton L. Anderson

[57] ABSTRACT

A one-piece, prefabricated bracket is provided which conveniently and effectively supports a pipe fitting having a change-of-direction section to an adjacent surface. The bracket is comprised of a body, a surround element, means for supporting the pipe fitting and means for attaching the bracket to the surface. In a typical embodiment, the bracket is adapted for supporting a T fitting or an ell fitting. The surround element is sized and dimensioned to surround the change-of-direction section of the pipe fitting so as to firmly retain the pipe fitting within the bracket. The attachment means is typically a pair of spaced-apart flanges attached to the body.

13 Claims, 3 Drawing Sheets

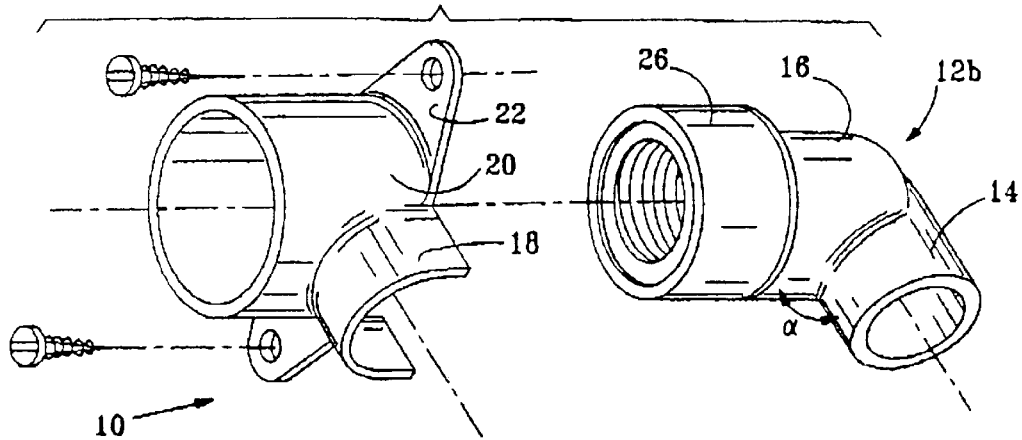
*fig.1*
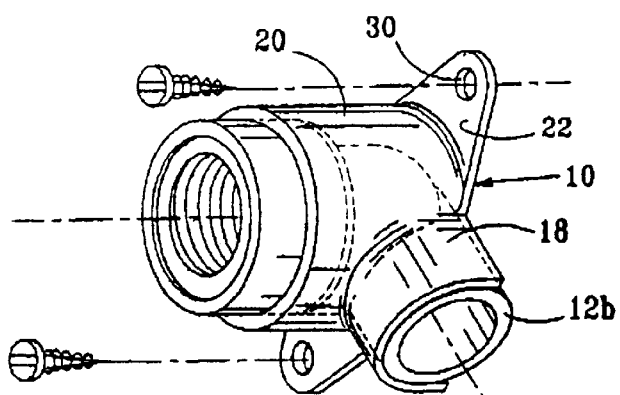
*fig.2*
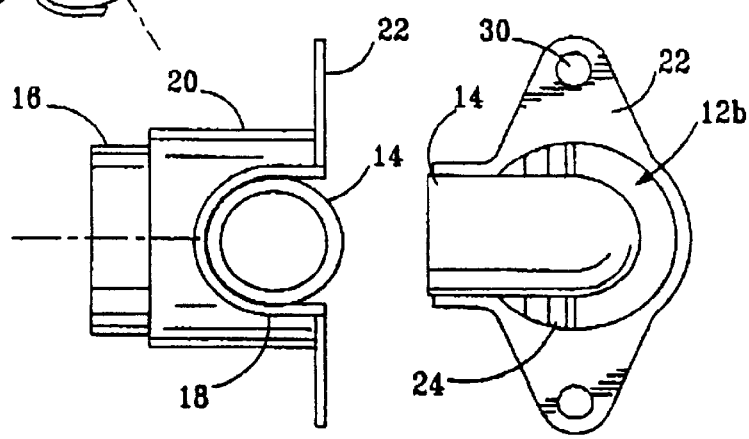
*fig.3*   *fig.4*

PIPE FITTING SUPPORT BRACKET

FIELD OF THE INVENTION

This invention is directly to brackets designed for mounting and supporting pipe fittings, and more specifically, to brackets designed for mounting and supporting non-metallic pipe fittings.

BACKGROUND OF THE INVENTION

Brackets for supporting pipe runs to an adjacent surface have been commonly used for a long time. However, the need for separate support for individual pipe fittings has only recently been recognized. Supports for individual pipe fittings from failure due to momentary extreme bending loads caused by unsupported mounting arms (such as shower heads, hose bibs) and long-term stresses that are generally caused by the weight of pipe runs or ancillary pipe equipment (such as spigots, washer hookups, etc.) To prevent the eventual failure of fittings under such stress, the fittings need to be separately reinforced. At present, there is nothing known in the art which provide such support in an effective and inexpensive manner.

Accordingly, there is a need for a pipe support bracket which solves the above-described problems with support brackets of the prior art.

SUMMARY

The invention satisfies this need. The invention is a bracket for mounting and supporting a pipe fitting to a surface wherein the pipe fitting comprises an in-line section and a change of direction section disposed at an angle of between about 5° and about 175° with respect to the in-line section. The bracket comprises (a) a body, (b) a surround element sized and dimensioned to at least partially surround the change of direction section so as to firmly retain the change of direction section, (c) support means for supporting the pipe fitting, and (d) at least one attachment flange for attaching the bracket to the surface, the at least one attachment flange being disposed in a plane which is substantially parallel with the in-line section when the bracket is supporting the pipe fitting. The bracket is an integral, one-piece unit.

In a typical embodiment, the surround element is sized and dimensioned to fully surround the change-of-direction section, and the support means comprises either the body of the bracket itself or a lip disposed on the surround element.

It is also typical that the "at least one attachment flange" comprises a pair of spaced-apart flanges disposed in a plane substantially parallel with the in-line section, each flange having an attachment aperture disposed therethrough.

The invention is ideal for supporting pipe fittings of the T fitting and ell fitting type.

DRAWINGS

These features, aspects and advantages of the present invention will become better understood with regard to the following description, appended claims and accompanying figures where:

FIG. 1 is an exploded perspective view of a bracket and fitting combination having features of the invention;

FIG. 2 is a non-exploded perspective view of the combination illustrated in FIG. 1;

FIG. 3 is a side view of the combination illustrated in FIG. 2;

FIG. 4 is a top view of the combination illustrated in FIG. 2;

DETAILED DESCRIPTION

Figure 5:
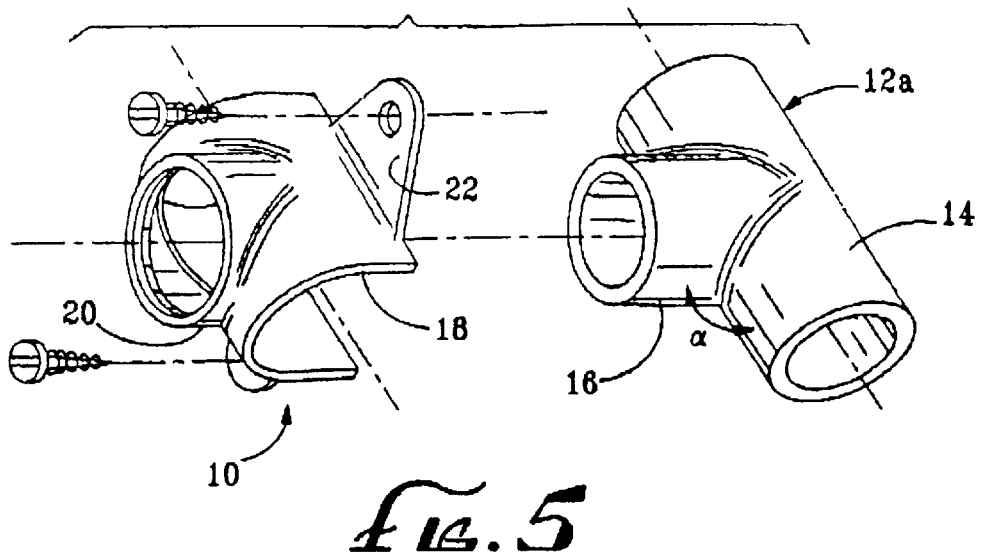
FIG. 5 is an exploded perspective view of a second bracket and fitting combination having features of the invention.
Figures 6, 7:
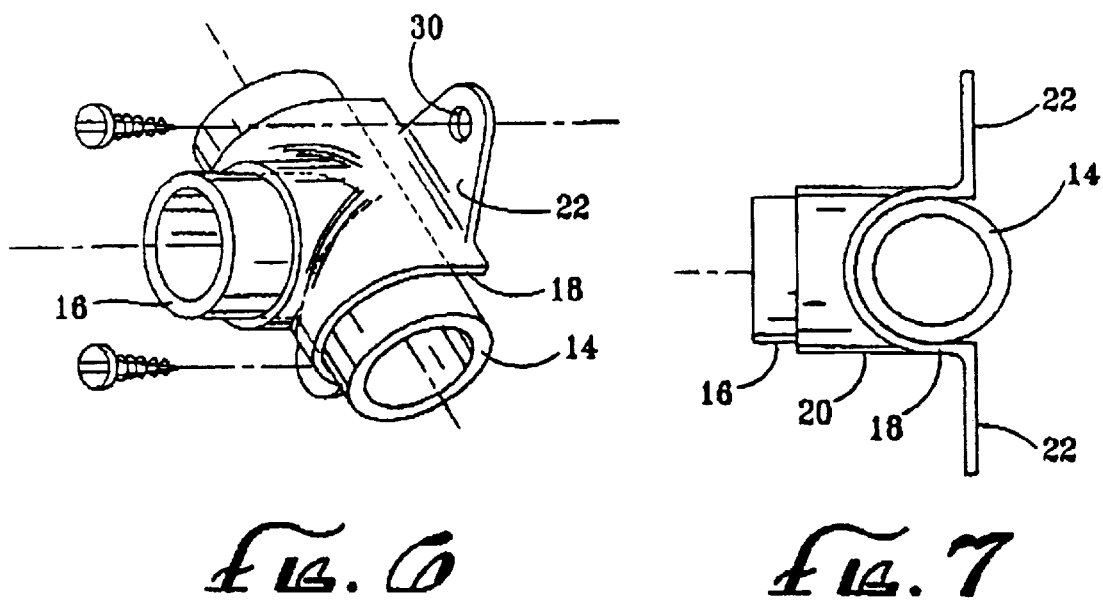
FIG. 6 is a non-exploded perspective view of the combination illustrated in FIG. 5.
FIG. 7 is a side view of the combination illustrated in FIG. 6.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a bracket 10 for mounting and supporting a pipe fitting section 12 to a surface wherein the pipe fitting 12 comprises a in-line section 14 and a change-of-direction section 16 disposed at an angle between about 5° and about 175° with respect to the in-line section 14. The bracket 10 comprises a body 18, a surround element 20, support means for supporting the pipe fitting 12 and at least one attachment flange 22 for attaching the bracket 10 to the surface. The bracket 10 is an integral, one-piece unit.

The term "pipe fitting" as used herein is to be interpreted broadly to encompass all forms of pre-fabricated conduit connection fittings having a change of direction section. "Pipe fittings" as used herein therefore includes what are commonly termed "tubing fittings" within the industry.

In a typical embodiment, the pipe fitting 12 is a T fitting 12a or an ell fitting 12b. The bracket 10 can be easily adapted for use with other pipe fittings as well. In the case of ell fittings 12b and T fittings 12a, the change-of-direction section 16 is disposed at an angle of about 90° with respect to the in-line section 14. The bracket 10 can be easily adapted, however, to pipe fittings 12 wherein the change-of-direction section 16 is disposed at virtually any angle with respect to the in-line section 14, preferably between about 30° and about 135°, and more preferably between about 45° and about 90°.

Where the pipe fitting 12 is an ell fitting 12b, the ell fitting 12b is preferable provided with opposed contoured upper sections 24 which conform to the curvature of the surround element 20.

The surround element 20 is attached to the body 18. The surround element 20 is sized and dimensioned to at least partially surround the change-of-direction section 16 so as to firmly retain the change-of-direction section 16. Preferably, the surround element 20 is sized and dimensioned to fully surround the change-of-direction section 16. Such design provides maximum support and rigidity.

The support means can be provided by the body 18 itself as is illustrated in FIGS. 1–7 wherein the pipe fitting 12 is supported by a U-shaped body 18 of a particular embodiment of the bracket 10 of the invention.

FIGS. 8–11 illustrate an alternative support means adapted for supporting a shoulder 26 portion of a pipe fitting 12. As illustrated in the drawings, the lip 28 is an internally projecting radial flange element. In FIGS. 8–11, the pipe fitting 12 is an ell fitting 12b having a shoulder 26. The support means for supporting the pipe fitting 12 is provided by a lip 28 disposed on the surround element 20. The lip 28 is sized and dimensioned to engage and support the shoulder 26 portion of the change-of-direction section 16.

The "at least one attachment flange" 22 is typically a pair of spaced-apart flanges 22 disposed in a plane substantially parallel with the in-line section 14, such as illustrated in each of the drawings. Such design allows the bracket 10 to be easily and rigidly retained to a surface proximate to the in-line section 14. In a typical embodiment, such surface is flat and the pair of spaced-apart flanges 22 are therefore disposed in the same plane. Where the surface is not flat, it will be recognized that the pair of spaced-apart flanges 22 will be preferably disposed at an acute angle with respect to one another, an acute angle which allows the flanges 22 to lie flat against the surface.

Typically, the "at least one attachment flange" 22 has an attachment aperture 30 disposed therethrough. Such attachment aperture 30 allows the user to conveniently mount the bracket 10 by use of a nail, screw or other appropriate attachment device.

The bracket 10 is typically made from a metal or plastic. Brackets 10 made from plastic are most conveniently and inexpensively manufactured, such as by an injection molding process.

The bracket 10 of the invention can be conveniently adapted for use with a strengthened pipe fitting, such as disclosed in U.S. Pat. No. 5,582,439, the contents of which are incorporated herein by reference. As disclosed in U.S. Pat. No. 5,582,439, an internally threaded end of a pipe fitting can be reenforced with respect to an externally threaded pipe by: (a) manufacturing the pipe fitting with an internally threaded surface extending from an attachment end of the fitting to at least a plane of normal wrench tight engagement, the internally threaded surface having (i) a pitch diameter along the internally threaded surface which is larger than that normally specified to mate with the externally threaded pipe member, and (ii) an effective thread length which extends from the attachment end to the plane of normal wrench tight engagement, and (b) radially and uniformly compressing the internally threaded surface along substantially the entire effective length with a compression band, prior to connecting the internally threaded surface of the externally threaded pipe member, so that the internally threaded surface has a pitch diameter along substantially the entire is effective thread length which (i) is normally specified to mate with the externally threaded member, and (ii) is reduced from the pitch diameter as originally manufactured.

Figure 8:
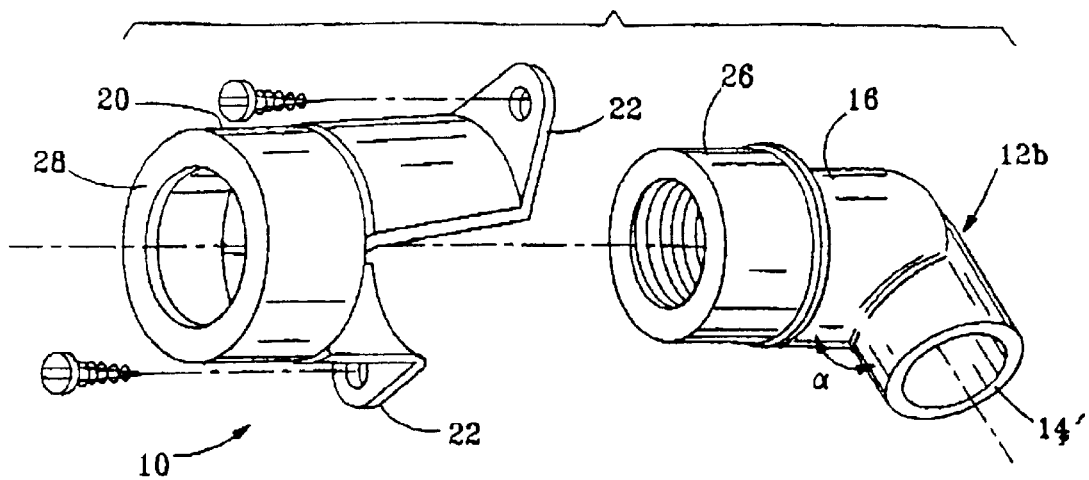
FIG. 8 is an exploded perspective view of a third bracket and fitting combination having features of the invention.
Figure 9:
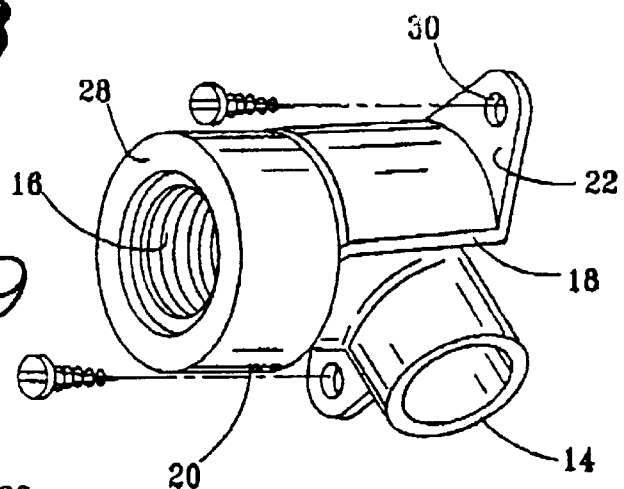
FIG. 9 is a non-exploded perspective view of the combination illustrated in FIG. 8.
Figure 10:
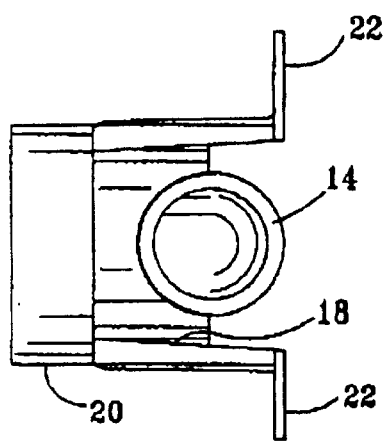
FIG. 10 is a side view of the combination illustrated in FIG. 9.
Figure 11:
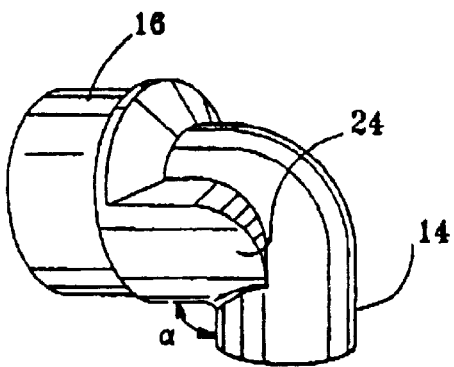
FIG. 11 is a perspective view of a fitting adapted for use in the invention.

When used to support pipe fittings strengthened by the method set forth in U.S. Pat. No. 5,582,439, the surround element 20 can act as the compression band. A typical example of this embodiment of the invention can be understood from the embodiment illustrated in FIG. 8. Where the surround element 20 in FIG. 8 is made from a very strong material, such as aluminum or other metal, the surround element 20 can be used as a compression band in the method taught by U.S. Pat. No. 5,582,439 to radially and uniformly compress the internally threaded surface of the ell fitting 12b.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A bracket for mounting and supporting a separate pipe fitting to a surface wherein the pipe fitting comprises an in-line section and a change of direction section, the change of direction section being disposed at an angle between about 5° and about 175° with respect to the in-line section, the bracket comprising:
   (a) a body;
   (b) a surround element adapted to be sized and dimensioned to surround the change of direction section when the pipe fitting is supported by the bracket so as to firmly retain the change of direction section;
   (c) support means comprising an internally projecting radial flange element disposed on the surround element for supporting the pipe fitting; and
   (d) at least one attachment flange for attaching the bracket to the surface, the attachment flange being disposed in a plane which is substantially parallel to the in-line section when the bracket is supporting the pipe fitting;

wherein the bracket is an integral, one-piece unit.

2. The bracket of claim 1 wherein the bracket is made of a plastic material.

3. The bracket of claim 2 wherein the bracket is produced by an injection molding process.

4. The bracket of claim 1 wherein the pipe fitting is a T fitting.

5. The bracket of claim 1 wherein the pipe fitting is an ell fitting.

6. The bracket of claim 1 wherein the at least one attachment flange comprises a pair of spaced-apart flanges disposed in a plane substantially parallel with the in-line section when the bracket is supporting the pipe fitting.

7. The bracket of claim 6 wherein each flange has an attachment aperture disposed therethrough.

8. A combination comprising:
   (a) a pipe fitting comprising an in-line section and a change of direction section, the change of direction section being disposed at an angle between about 5° and about 175° with respect to the in-line section; and
   (b) a bracket comprising:
      (i) a body;
      (ii) a surround element surrounding the change of direction section so as to firmly retain the chance of direction section;
      (iii) support means comprising an internally projecting radial flange element disposed on the surround element for supporting the pipe fitting; and
      (iv) at least one attachment flange for attaching the bracket to the surface, the attachment flange being disposed in a plane which is substantially parallel to the in-line section;

wherein the bracket is an integral, one-piece unit, and wherein the change of direction section has an end adapted with internal threads and wherein the pipe fitting is supported by the bracket, the internally threaded end being fully surrounded by the surround element, and the surround element acting as a compression band with respect to the internally threaded end of the change of direction section.

9. A combination comprising:
   (a) a pipe fitting comprising an in-line section and a change of direction section, the change of direction section being disposed at an angle between about 5° and about 175° with respect to the in-line section; and
   (b) a bracket comprising:
      (i) a body;
      (ii) a surround element surrounding the change of direction section so as to firmly retain the change of direction section;

(iii) support means comprising an internally projecting radial flange element disposed on the surround element for supporting the pipe fitting; and (iv) at least one attachment flange for attaching the bracket to the surface, the attachment flange being disposed in a plane which is substantially parallel to the in-line section;

wherein the bracket is an integral, one-piece unit.

10. A bracket for mounting and supporting a separate pipe fitting to a surface wherein the pipe fitting comprises an in-line section moiety disposed substantially parallel to the surface and the change of direction section disposed at an angle of between about 45° and about 90° with respect to the in-line section, the bracket comprising:

(a) a body;

(b) a surround element adapted to be sized and dimensioned to surround the change of direction section when the pipe fitting is supported by the bracket so as to firmly retain the change of direction section;

(c) support means comprising an internally projecting radial flange element disposed on the surround element for supporting the pipe fitting; and (d) a pair of spaced-apart flanges for attaching the bracket to the surface;

wherein the bracket is an integral, one-piece unit.

11. The bracket of claim 10 wherein the change of direction section is disposed at an angle of about 90° with respect to the in-line section.

12. The bracket of claim 10 wherein the pipe fitting is a T fitting.

13. The bracket of claim 10 wherein the pipe fitting is an ell fitting.

\* \* \* \* \*